United States Patent [19]
Allison

[11] Patent Number: 5,645,318
[45] Date of Patent: Jul. 8, 1997

[54] SEAT BACK SUPPORT CONNECTION

[75] Inventor: Gregory Allison, Kego Harbor, Mich.

[73] Assignee: Lear Corporation, Southfield, Mich.

[21] Appl. No.: 654,911

[22] Filed: May 29, 1996

[51] Int. Cl.$^6$ .................................. B60N 2/02; B60N 2/06
[52] U.S. Cl. .................. 297/383; 397/452.18; 397/344.1; 248/430
[58] Field of Search .......................... 297/383, 452.11, 297/340, 344.1, 343, 452.2, 452.18; 248/429, 430

[56] References Cited

U.S. PATENT DOCUMENTS

| | | | |
|---|---|---|---|
| 2,634,796 | 4/1953 | Fischer | 297/343 |
| 2,708,474 | 5/1955 | Lindroth | 297/343 |
| 3,224,807 | 12/1965 | Welch et al. | 297/383 |
| 3,685,872 | 8/1972 | Babbs . | |
| 3,930,632 | 1/1976 | Shigeta et al. . | |
| 4,386,805 | 6/1983 | Boisset | 297/452.11 |
| 4,720,073 | 1/1988 | Mann et al. . | |
| 4,770,463 | 9/1988 | Nishino | 297/344.1 |
| 4,948,189 | 8/1990 | Terada et al. . | |
| 5,137,244 | 8/1992 | Negi | 248/430 |

FOREIGN PATENT DOCUMENTS 59-18028  1/1984  Japan ....................................... 297/303

Primary Examiner—Peter M. Cuomo
Assistant Examiner—Anthony D. Barfield
Attorney, Agent, or Firm—Howard & Howard

[57] ABSTRACT

A support mechanism supports a seat back 14 on a seat frame 12 and includes a tongue 18, 20 and groove 22, 24 connection for mounting the seat back 14 to the seat frame 12 by sliding the tongues 18, 20 into the grooves 20, 22. A channel member defines the upper rail of a seat track with inner and outer sides 26 and 28 and a top 30 extending between the first 26 and second 28 sides. The tongues 18 and 20 extend in opposite directions and are coplanar with the top 30 of the channel member. A pair of brackets 32 define the grooves 18 and 20 which are disposed about the tongues 22 and 24 of the channel member to limit movement between the brackets 32 and the channel members in a direction transverse to the tongues 18, 20 and the grooves 22,24. Once the brackets 32 are slid onto the channel members, a rivet 42 is inserted through each bracket 32 and through the top 30 of the associated channel for preventing the sliding movement of the brackets 32 along the channels.

10 Claims, 2 Drawing Sheets

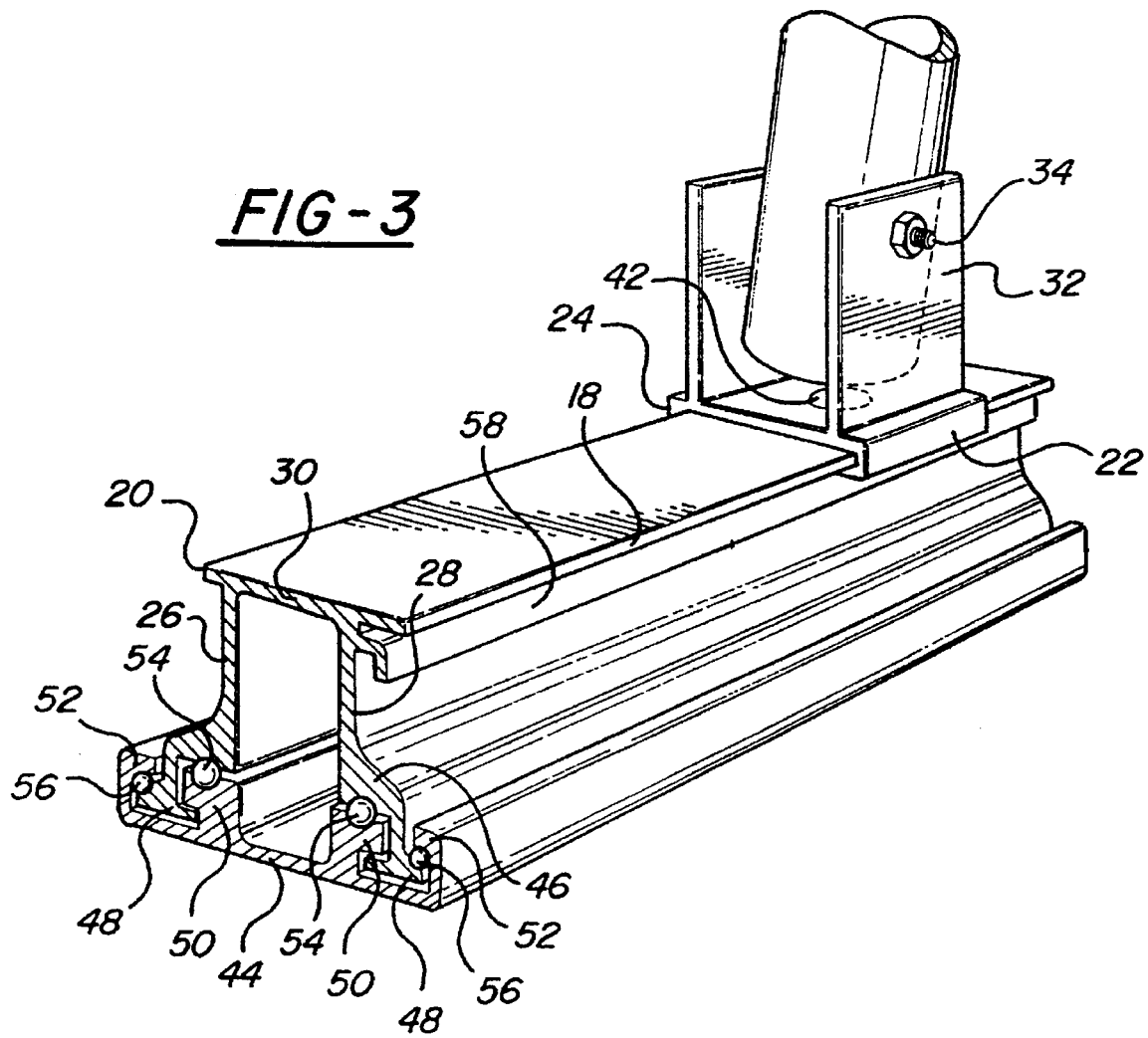

SEAT BACK SUPPORT CONNECTION

TECHNICAL FIELD

The subject invention relates to seats of the type used in automotive vehicles.

BACKGROUND OF THE INVENTION

Automotive seat assemblies are built up to a complete and finished sub-assembly and then shipped to a vehicle assembly facility for mounting within the vehicle. It is frequently desirable to fabricate various seat configurations whereby like models of vehicles have different seat configurations. In order to efficiently accomplish this objective, seat components are combined in various combinations. For example, different seat back configurations may be mounted on like seat bottoms. This results in a need for simple connections between the seat components for easy and rapid assembly of the seat components.

SUMMARY OF THE INVENTION

A seat assembly of the type utilized in automotive vehicles for supporting an occupant and comprising a seat frame defining an occupant sitting-area and a back frame defining an occupant back supporting area. A support mechanism supports the seat back on the seat frame and includes a tongue and groove connection for mounting the seat back to the seat frame by sliding the tongue into the groove.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a perspective view of one side of the assembly of FIG. 2.

DETAILED DESCRIPTION OF THE PREFERRED EMBODIMENT

Figure 1:
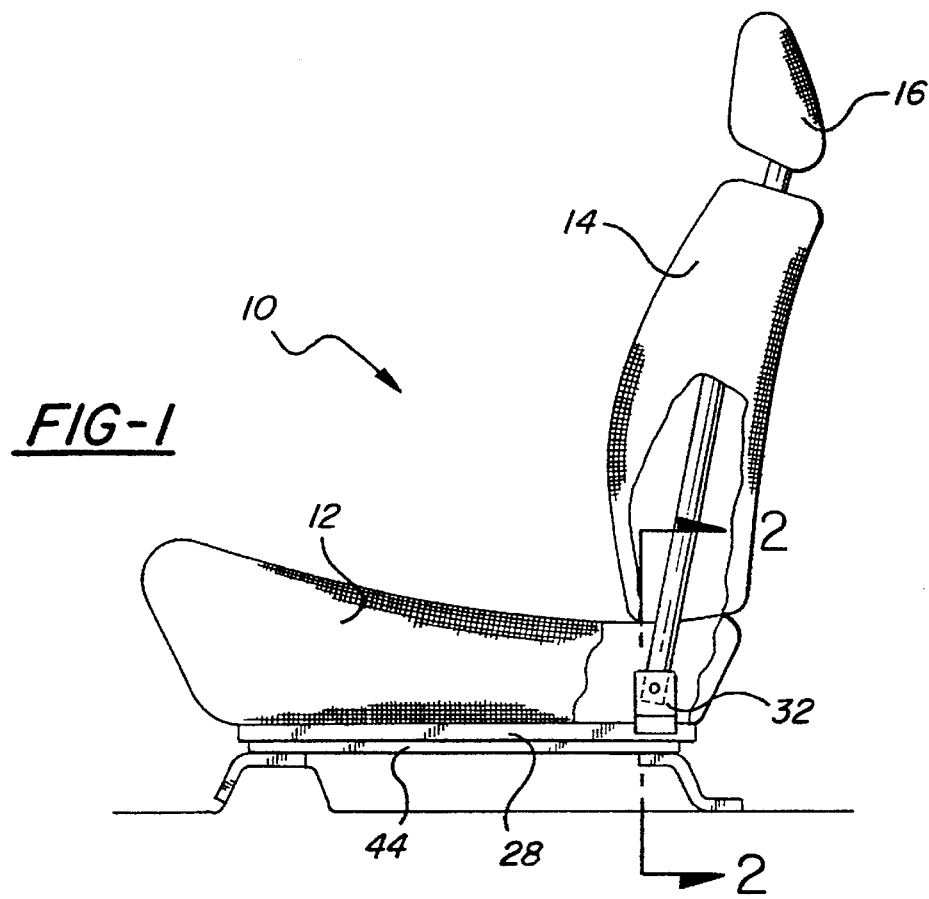
FIG. 1 is a side elevational view, partially broken away, of a seat assembly incorporating the subject invention.
Figure 2:
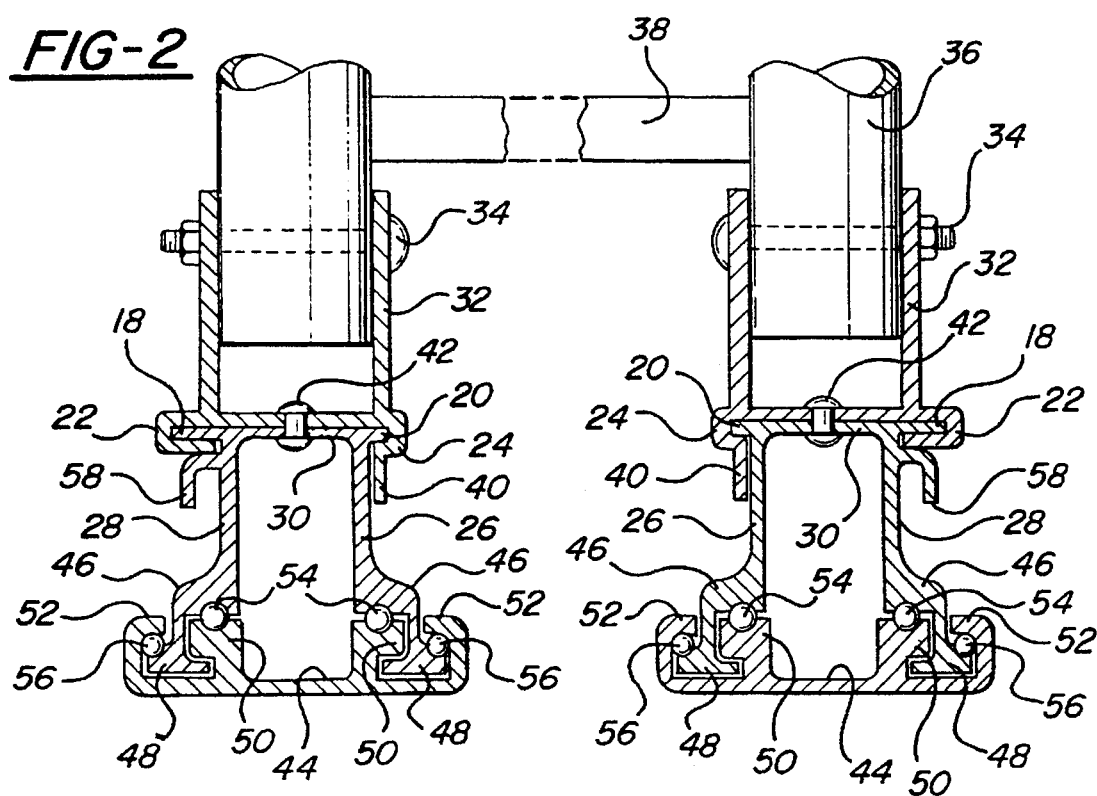
FIG. 2 is an enlarged cross sectional view taken substantially along line 2—2 of FIG. 1.

Referring to the Figures, wherein like numerals reference like or corresponding parts throughout the several views, a seat assembly is generally shown at 10 in FIG. 1. The seat assembly 10 is of the type utilized in automotive vehicles for supporting an occupant and comprises a seat frame 12 defining an occupant sitting area and a back frame 14 defining an occupant back supporting area. A headrest 16 is supported at the top of the seat back 14.

A support mechanism supports the seat back 14 on the seat frame 12 and includes a tongue 18, 20 and groove 22, 24 connection for mounting the seat back 14 to the seat frame 12 by sliding the tongues 18, 20 into the grooves 20, 22. More specifically, the seat frame 14 comprises a channel member as viewed in cross-section with first and second, or inner and outer, sides 26 and 28 and a top 30 extending between the first 26 and second 28 sides. The inner tongue 20 extends outwardly from the first or inner side 26 and the outer tongue extends outwardly in the opposite direction from the second or outward side 28. The tongues 18 and 20 extend in opposite directions and are coplanar with the top 30 of the channel member. A pair of the channel members are spaced from one another on opposite sides of the seat assembly 10 with the first tongues 18 extending outwardly from the outer sides 28 and the second tongues 20 extending inwardly toward one another from the inner sides 26.

The seat back 14 includes a bracket 32 having a pair of upwardly extending legs or flanges attached to structural members 36 of the seat back frame by bolts 34. The structural members 36 are interconnected by a brace 38. As will be appreciated, the bolts may be replaced by various fasteners or welds, or the like. The bottom of the bracket 32 extends through U-shaped sections defining the grooves 22 and 24. The tongues 18 and 20 are in close sliding engagement with the grooves 22 and 24 to transfer the loads from the seat back to the seat frame without relative movement therebetween.

The assembly includes a pair of the brackets 32 with the grooves 18 and 20 of one bracket disposed about the tongues 22 and 24 of one channel member and the grooves 18 and 20 of the other bracket disposed about the tongues 22 and 24 of the other channel member. The bracket 32 therefore defines grooves disposed about the tongues to limit movement between the bracket 32 and the channel member in a direction transverse to the tongues 18, 20 and the grooves 22,24.

Each bracket 32 extends along only a portion of the length of the associated channel member and includes a flange 40 extending from the inner groove 24 and which is in sliding engagement with the first side 26 of the channel member. Each bracket 32 includes a G-shaped cross section defining the grooves 18, 20 and the flange 40, and the parallel and spaced legs extend from the back side of the G-shaped section, with the structural member 36 of the back frame supported by and between the legs of the bracket 32.

Once the brackets 32 are slid onto the channel members, a fastener in the form of a rivet 42 is inserted through the middle of the G-shaped section of the bracket 32 and through the top 30 of the channel for preventing the relive sliding movement of the bracket 32 along its associated channel.

The channel members define the upper rail of a seat track which also includes a lower rail 44 slidably connected to the upper rail. Each channel member has shoulders 46 at the lower ends of the sides 26 and 28 thereof. Arms depend from the shoulders 46 and terminate in T-shaped slides 48. The lower rails 44 present L-shaped posts 50 hooked over the insides of the T-shapes and the lower rails are C-shaped for extending around the T-shapes on the outsides thereof. A first plurality of roller elements 54 are disposed between the shoulders 46 of the upper rails and the L-shaped posts 50 of the lower rails 44 and a second plurality of roller elements 56 are disposed between the outsides of the T-shapes and the C-shaped sides 52 of the lower rails 44 to facilitate the sliding movement between the rails.

The invention has been described in an illustrative manner, and it is to be understood that the terminology which has been used is intended to be in the nature of words of description rather than of limitation.

The upper rail or channel also includes a trim retaining flange or tab 58 disposed below the outer tongue 18. The outer fabric trim or cover of the seat may be secured to the tabs 58 by clips, or the like.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A seat assembly of the type utilized in automotive vehicles for supporting an occupant, the assembly comprising:

a seat frame defining an occupant sitting area, said seat frame comprising a pair of channel members as viewed in cross-section spaced from one another on opposite sides of said seat assembly, each of said channel members define an upper rail of a seat track which includes a lower rail slidably connected to said upper rail, said channel members including first and second sides and a top extending between said first and second sides;

a back frame defining an occupant back supporting area, said back frame including a pair of brackets extending along a portion of the length of said respective channel, each of said brackets defining a first and second groove;

support mechanism for supporting said back frame on said seat frame;

said support mechanism including a tongue extending outwardly from each of said first and second sides of said channel members for mounting said back frame to said seat frame by sliding said tongues into said respective grooves.

2. An assembly as set forth in claim 1 wherein each of said tongues is in close engagement with said respective grooves to transfer the loads from said back frame to said seat frame.

3. An assembly as set forth in claim 2 including a fastener for preventing said sliding movement.

4. An assembly as set forth in claim 3 wherein said first groove is disposed about said first tongue and said second groove is disposed about said second tongue of each said bracket and channel member to limit movement between said bracket and said channel member in a direction transfer to said tongues and said grooves.

5. An assembly as set forth in claim 4 wherein said bracket includes a flange extending from said first groove and in engagement with said first side of said channel member.

6. An assembly as set forth in claim 5 wherein said tongues extend in opposite directions and are coplanar with said top of said channel member.

7. An assembly as set forth in claim 6 wherein said bracket includes a G-shaped section defining said grooves and said flange, and parallel spaced legs extending from the back side of said G-shaped section.

8. An assembly as set forth in claim 7 wherein said back frame includes a frame member supported by and between said legs of said bracket.

9. An assembly as set forth in claim 8 wherein said channel member defines the upper rail of a seat track, said seat track including a lower rail slidably connected to said upper rail.

10. An assembly as set forth in claim 9 including roller elements disposed between said upper and lower rails to facilitate the sliding movement between said rails.

* * * * *